United States Patent
Ikeda et al.

(10) Patent No.: US 9,995,337 B2
(45) Date of Patent: Jun. 12, 2018

(54) STEERED SHAFT SUPPORT STRUCTURE

(71) Applicant: JTEKT CORPORATION, Osaka-shi, Osaka (JP)

(72) Inventors: Tetsuo Ikeda, Kashiba (JP); Hidetoshi Sumihara, Kitakatsuragi-gun (JP); Satoshi Abe, Yamatotakada (JP); Rika Kagawa, Nara (JP); Kenji Kuboki, Shiki-gun (JP); Kaname Joushita, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days. days.

(21) Appl. No.: 15/334,424

(22) Filed: Oct. 26, 2016

(65) Prior Publication Data

US 2017/0130769 A1    May 11, 2017

(30) Foreign Application Priority Data

Nov. 10, 2015    (JP) .................................. 2015-220606

(51) Int. Cl.
*F16C 27/06*    (2006.01)
*F16C 17/02*    (2006.01)
(Continued)

(52) U.S. Cl.
CPC .............. *F16C 27/063* (2013.01); *B62D 1/20* (2013.01); *B62D 3/12* (2013.01); *B62D 3/126* (2013.01);
(Continued)

(58) Field of Classification Search
CPC ........ F16C 17/02; F16C 27/063; F16C 29/02; F16C 29/002; F16C 33/20; F16C 2240/40;
(Continued)

(56) References Cited

U.S. PATENT DOCUMENTS 7,220,056 B2 * 5/2007 Kubota ................... B62D 1/16
384/215
8,272,785 B2 * 9/2012 Hirose ..................... B62D 3/12
384/215
(Continued)

FOREIGN PATENT DOCUMENTS

DE    27 34 516 A1    2/1979
EP    0 507 164 A2    10/1992
(Continued)

OTHER PUBLICATIONS

Mar. 29, 2017 Extended Search Report issued in European Patent Application No. 16197053.8.

*Primary Examiner* — Marcus Charles
(74) *Attorney, Agent, or Firm* — Oliff PLC

(57) ABSTRACT

A rack bushing supported by an annular elastic member in a housing includes a bushing body and a flange portion extending outward in a radial direction from a first axial end of the rack bushing. The flange portion is positioned at a step portion of an inner periphery of the housing. The bushing body includes a second axial slit extending from a second axial end to a middle portion in an axial direction. A gap that communicates with the second axial slit is formed between the inner periphery of the housing and an outer surface of the bushing body. A recessed groove (communication passage) of the flange portion allows a first space, disposed on a housing-end side with respect to the rack bushing in the housing, to communicate with the gap.

8 Claims, 5 Drawing Sheets

(51) Int. Cl.
*F16C 35/02* (2006.01)
*B62D 3/12* (2006.01)
*B62D 1/20* (2006.01)

(52) U.S. Cl.
CPC .............. *F16C 17/02* (2013.01); *F16C 35/02* (2013.01); *F16C 2326/01* (2013.01); *F16C 2326/24* (2013.01)

(58) Field of Classification Search
CPC ............. F16C 2326/01; F16C 2326/24; F16C 325/02; F16C 25/02; B62D 1/20; B62D 3/12; B62D 25/22; F16J 15/3216; F16J 325/02
USPC ......... 384/42, 202, 220, 275–276, 291, 299, 384/283; 280/93.524, 93.515; 74/388 PS; 180/444
See application file for complete search history.

(56) References Cited

U.S. PATENT DOCUMENTS

| | | | | |
|---|---|---|---|---|
| 8,696,207 B2* | 4/2014 | Tange | ................... | F16C 27/063 384/215 |
| 2002/0085778 A1* | 7/2002 | Mena | ....................... | B62D 3/12 384/276 |
| 2007/0017732 A1* | 1/2007 | Harer | ....................... | B62D 5/22 180/444 |
| 2008/0088104 A1* | 4/2008 | Arlt | ......................... | B62D 3/12 280/93.514 |
| 2009/0000853 A1* | 1/2009 | Hirose | .................... | B62D 3/12 180/400 |
| 2010/0239199 A1* | 9/2010 | Nakagawa | ........... | B62D 5/0409 384/283 |
| 2015/0020618 A1* | 1/2015 | Kawakubo | .............. | F16C 29/02 74/30 |
| 2015/0204381 A1* | 7/2015 | Zaike | .................... | F16C 27/063 384/202 |

FOREIGN PATENT DOCUMENTS

| | | | | | |
|---|---|---|---|---|---|
| EP | 1394426 A2 | * | 3/2004 | ............... | B62D 1/16 |
| EP | 1 911 658 A1 | | 4/2008 | | |
| GB | 914 575 A | | 1/1963 | | |
| GB | 2 002 087 A | | 2/1979 | | |
| JP | 2003322165 A | * | 11/2003 | | |
| JP | 2004-183780 A | | 7/2004 | | |
| JP | 2004347105 A | * | 12/2004 | ............... | B62D 1/16 |
| JP | 2007009962 A | * | 1/2007 | ............... | F16C 35/02 |
| JP | 2007-040429 A | | 2/2007 | | |
| JP | 2013-142451 A | | 7/2013 | | |

* cited by examiner

STEERED SHAFT SUPPORT STRUCTURE

INCORPORATION BY REFERENCE

The disclosure of Japanese Patent Application No. 2015-220606 filed on Nov. 10, 2015 including the specification, drawings and abstract is incorporated herein by reference in its entirety.

BACKGROUND OF THE INVENTION

1. Field of the Invention

The present invention relates to a steered shaft support structure.

2. Description of the Related Art

For steering systems of automobiles, a rack bushing has been proposed which supports a rack shaft serving as a steered shaft such that the rack shaft can reciprocate in a housing (see, for example, Japanese Patent Application Publication No. 2013-142451 (JP 2013-142451 A)). In general, each end of the rack shaft protruding from a corresponding one of ends of the housing is covered with and protected by a corresponding one of boots whose one end is fitted to the outside of the end of the housing. With a motion of the rack shaft in an axial direction, one boot is expanded and the other boot is contracted. The expansion and contraction of the boots increase and decrease pressure of the interior of the boots. This causes air to flow between one end and the other end of a rack bushing, generating an abnormal noise like a whistling noise.

For this reason, one technique has been proposed which provides an axial groove formed in an inner periphery of a rack bushing and extending from one end to the other end of the rack bushing (see, for example, Japanese Patent Application Publication No, 2004-183780 (JP 2004-183780 A)).

In JP 2004-183780 A, the rack bushing is provided, on one end of the rack bushing, with a flange portion extending outward in a radial direction. The flange portion is engaged with a step portion of the inner periphery of a housing, and thus the rack bushing is positioned in an axial direction. Since the flange portion is in contact with the step portion of the inner periphery of the housing, almost no air flows through an outer periphery side of the rack bushing (that is, between the rack bushing and the housing). Consequently, the air flows only through an inner periphery side of the rack bushing (that is, between the rack bushing and the rack shaft). Since a cross-sectional area for the air flow is small, the occurrence of the abnormal noise may not be prevented.

SUMMARY OF THE INVENTION

An object of the present invention is to provide a steered shaft support structure that can prevent occurrence of abnormal noise caused by air flow.

According to an aspect of the present invention, a steered shaft support structure includes a tubular housing through which a steered shaft is coaxially inserted and an inner periphery of which is provided with a step portion facing an end of the housing. The steered shaft support structure also includes a cylindrical bushing including a bushing body and a flange portion. The bushing body has a first axial end on a housing end side, a second axial end opposite to the first axial end, an outer surface facing the inner periphery of the housing, an inner surface that supports the steered shaft so that the steered shaft is capable of sliding in an axial direction, an outer recessed portion formed in the outer surface and extending in a circumferential direction, and an axial slit extending from the second axial end, across the outer recessed portion, to a middle portion in the axial direction. The flange portion extends outward in a radial direction from the first axial end of the bushing body, and is engaged with the step portion so as to be positioned in the axial direction. The steered shaft support structure further includes an annular elastic member held in the outer recessed portion to elastically support the bushing on the housing such that a gap that communicates with the axial slit is formed between the inner periphery of the housing and the outer surface of the bushing body. The flange portion is provided with a communication passage formed therein so that a housing-end side space disposed on the housing end side with respect to the bushing in the housing communicates with the gap.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
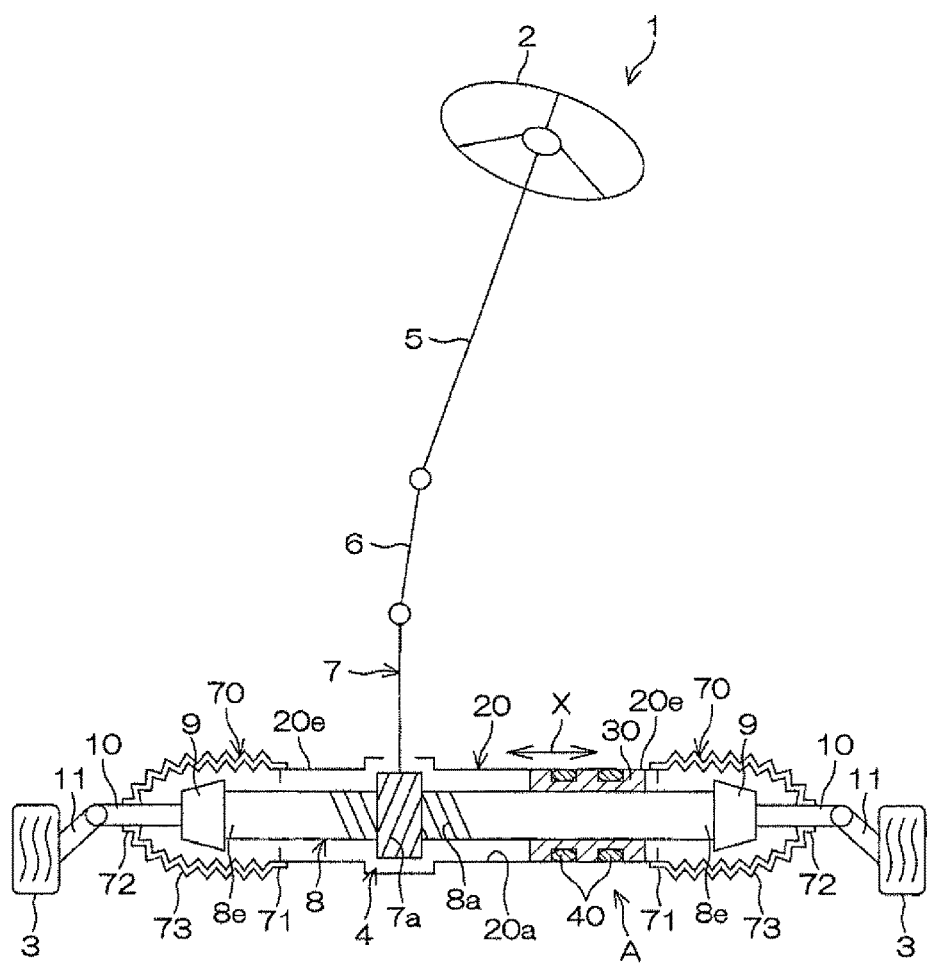
FIG. 1 is a diagram showing the schematic configuration of a steering system to which a steered shaft support structure of a first embodiment of the present invention is applied.

Hereinafter, embodiments of the present invention will be specifically described with reference to the accompanying drawings. FIG. 1 is a diagram showing the schematic configuration of a steering system 1 to which a steered shaft support structure of a first embodiment of the present invention is applied. As shown in FIG. 1, the steering system 1 includes a rotationally operated steering member 2, such as a steering wheel, and a steering operation mechanism 4. The steering operation mechanism 4 steers steered wheels 3 in response to the rotation of the steering member 2. The steering system 1 includes a steering shaft 5, one end of which is coupled to the steering member 2, and an intermediate shaft 6.

The steering operation mechanism 4 includes, for example, a rack-and-pinion mechanism. The steering operation mechanism 4 includes a pinion shaft 7, and a rack shaft 8 that serves as a steered shaft. The pinion shaft 7 is coupled to the steering shaft 5 via the intermediate shaft 6. The pinion shaft 7 is provided with a pinion 7a formed near an end of the pinion shaft 7. The rack shaft 8 is provided with a rack 8a, on the outer periphery of a portion of the rack shaft 8 in an axial direction X; the rack 8a meshes with the pinion 7a of the pinion shaft 7.

The steering system 1 includes a steered shaft support structure A that supports the rack shaft 8 (steered shaft). The steered shaft support structure A includes a tubular housing 20 (corresponding to a rack housing), a cylindrical rack bushing 30, and a pair of annular elastic members 40. The rack bushing 30 is made of a resin and formed by injection molding. The housing 20 is fixed to a vehicle body. The rack shaft 8 is coaxially inserted through the housing 20. The rack bushing 30 is formed like a cylinder that surrounds the rack shaft 8 in the housing 20. The annular elastic members 40 are, for example, O rings that surround the rack bushing 30. The annular elastic members 40 allow the rack bushing 30 to be elastically supported on an inner periphery 20a of the housing 20.

The rack shaft 8 includes a pair of rack shaft ends 8e. Each rack shaft end 8e protrudes from a corresponding one of housing ends 20e of the housing 20. Each rack shaft end 8e is coupled to an end of a corresponding one of tie rods 10, via a corresponding one of ball joints 9. The other end of each tie rod 10 is coupled to a corresponding one of steered wheels 3, via a corresponding one of knuckle arms 11.

The steering system 1 includes a pair of tubular boots 70. Each boot 70 covers a corresponding one of the housing ends 20e, a corresponding one of the rack shaft ends 8e, a corresponding one of the ball joints 9, and a portion of a corresponding one of the tie rods 10. The boot 70 is made of a synthetic resin, such as polyolefin elastomer, and is capable of expansion and contraction. Each boot 70 extends in the axial direction of the rack shaft 8, and includes a first annular boot end 71, a second annular boot end 72, and a bellows portion 73. The interior of each boot 70 is sealed. Specifically, the first boot end 71 is tightly fastened to the outer periphery of the housing end 20e. The second boot end 72 is tightly fastened to the outer periphery of a middle portion of the tie rod 10. The bellows portion 73 is interposed between the first boot end 71 and the second boot end 72, and has peak portions and valley portions alternately arranged.

When the steering shaft 5 is rotated by a rotational operation of the steering member 2, the rotation of the steering shaft 5 is converted into a linear motion of the rack shaft 8 in the axial direction X, via the pinion 7a and the rack 8a. This achieves steering of the steered wheels 3. With the motion of the rack shaft 8 in the axial direction X, one of the boots 70 is expanded and the other boot 70 is contracted. The bellows portions 73 of the boots 70, at this time, flexibly expand and contract to follow the motion of the rack shaft 8.

Figure 2:
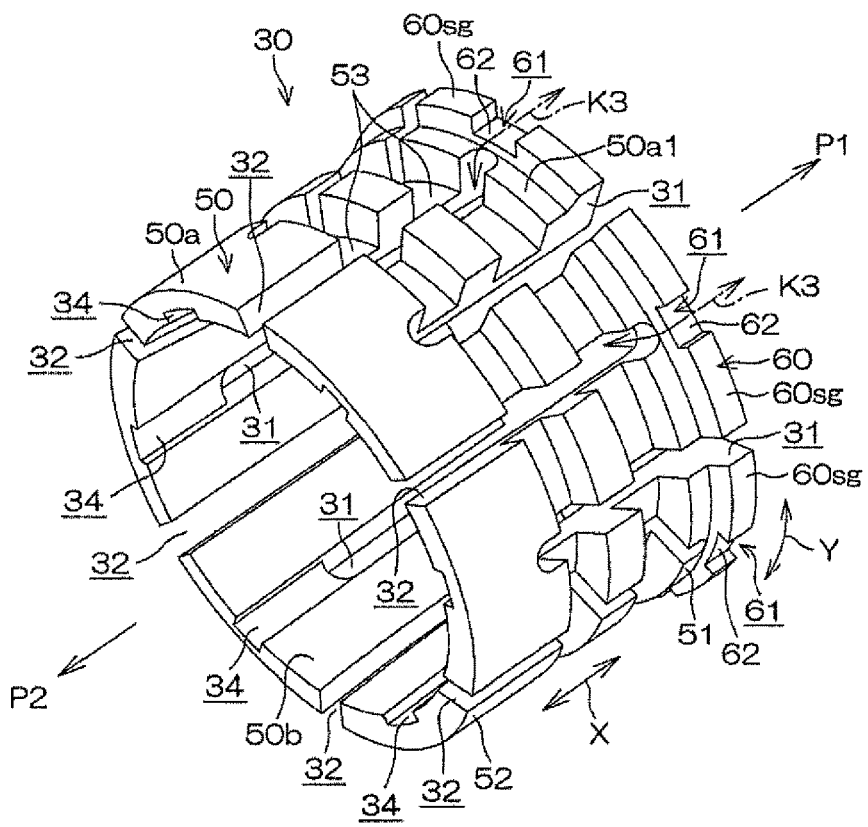
FIG. 2 is a perspective view of a rack bushing in the first embodiment.
Figure 3:
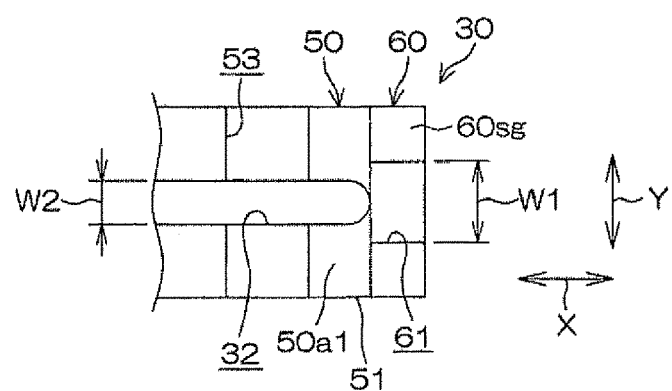
FIG. 3 is a schematic plan view of a main part of the rack bushing in the first embodiment.
Figure 4:
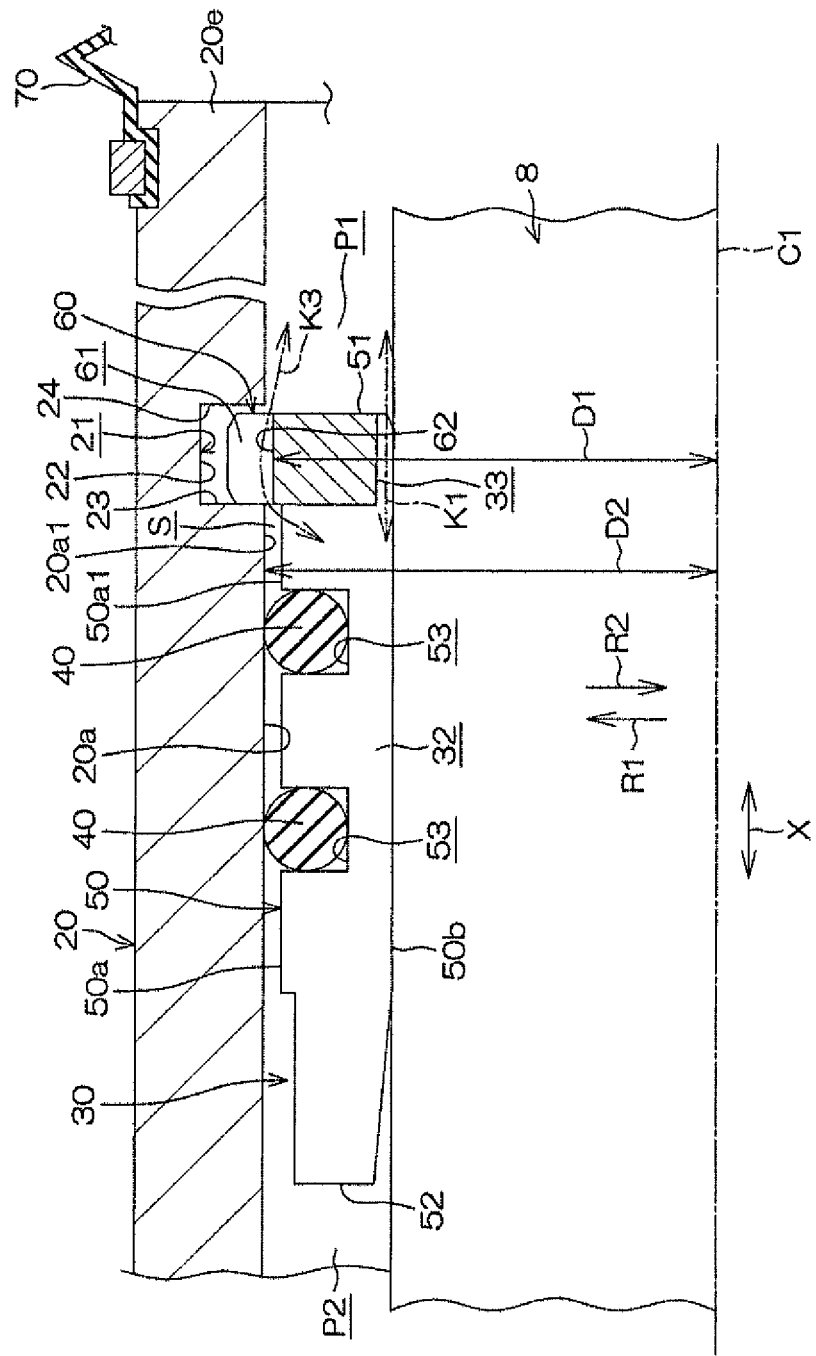
FIG. 4 is a sectional view of the steered shaft support structure of the first embodiment, specifically, taken along a second axial slit.
Figure 5:
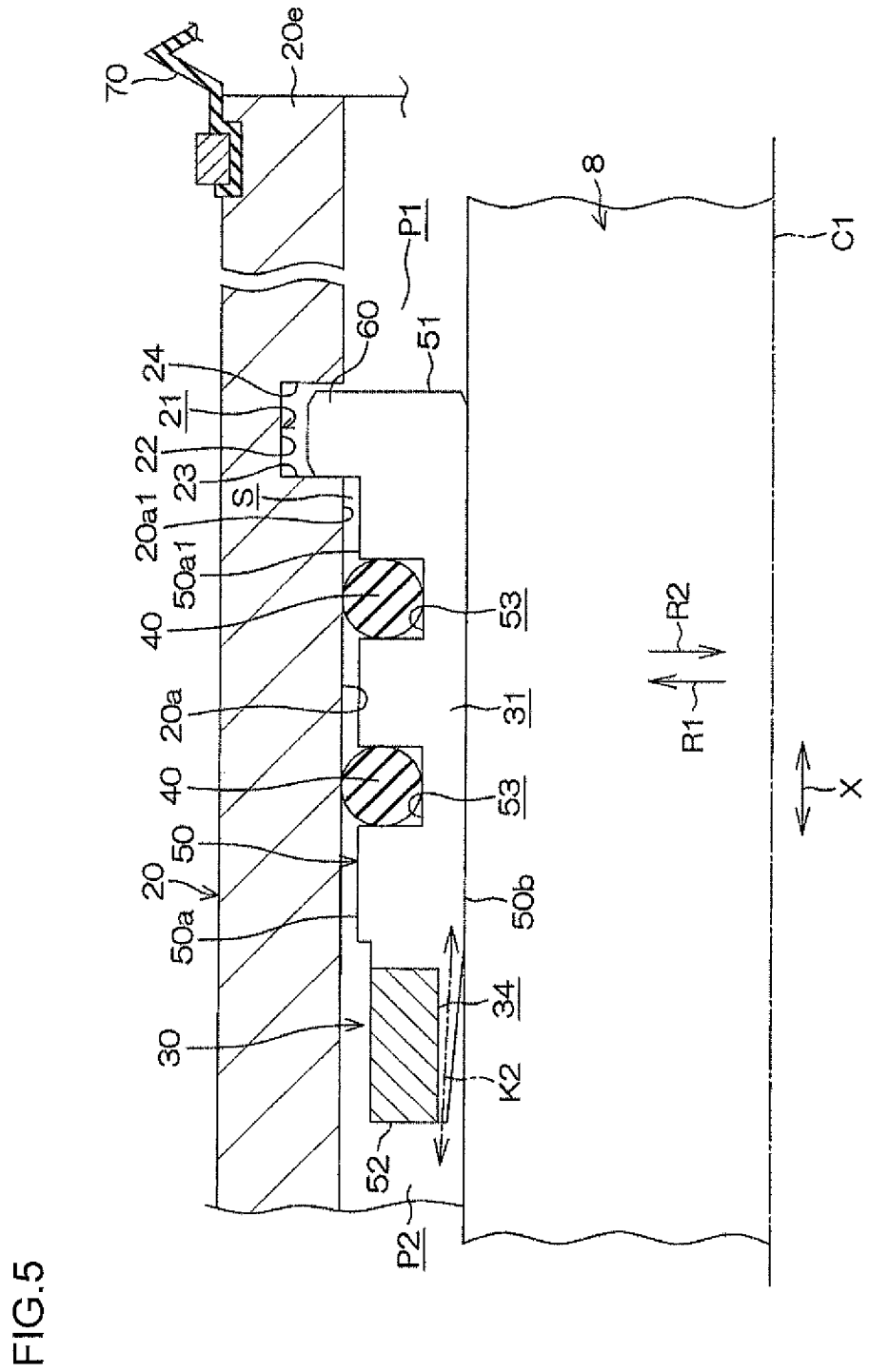
FIG. 5 is a sectional view of the steered shaft support structure of the first embodiment, specifically, taken along a first axial slit.

FIG. 2 is a perspective view of the rack bushing 30. FIG. 3 is a schematic plan view of a main part of the rack bushing 30. FIGS. 4 and 5 are sectional views of the steered shaft support structure A. As shown in FIGS. 2, 4, and 5, the rack bushing 30 includes a bushing body 50 and a flange portion 60. The bushing body 50 includes a first axial end 51 on a housing end 20e side, and a second axial end 52 opposite to the first axial end 51.

As shown in FIG. 4, the inner periphery 20a of the housing 20 is provided with an annular groove 21. The annular groove 21 holds the flange portion 60 of the rack bushing 30. The annular groove 21 includes a bottom portion 22, and a pair of step portions 23 and 24 formed by a pair of inner wall portions. The step portion 23 faces the housing end 20e. The flange portion 60 of the rack bushing 30 extends from the first axial end 51 of the bushing body 50, outward R1 in a radial direction. The flange portion 60 is in contact with the step portion 23 or 24 of the housing 20. This positions the rack bushing 30 with respect to the housing 20 in the axial direction X.

The inner space of the housing 20 includes a first space P1 and a second space P2. The first space P1 is a housing-end side space disposed on the housing end 20e side with respect to the rack bushing 30. The second space P2 is disposed opposite to the rack bushing 30 from the first space P1. The first space P1 (housing-end side space) is in direct communication with the space of the boot 70. The bushing body 50 includes an outer surface 50a and an inner surface 50b. The outer surface 50a faces the inner periphery 20a of the housing 20. The inner surface 50b supports the rack shaft 8 such that the rack shaft 8 can slide in the axial direction X. The space between the inner surface 50b and the rack shaft 8 is filled with lubricating grease.

As shown in FIGS. 2 and 4, the outer surface 50a is provided with a pair of outer recessed portions 53 extending in a circumferential direction Y and separated from each other in the axial direction X. As shown in FIG. 4, the annular elastic members 40 are held in the respective outer recessed portions 53, and elastically engaged with the inner periphery 20a of the housing 20, in a state in which the annular elastic members 40 are elastically compressed. The annular elastic members 40 elastically support the rack bushing 30 on the housing 20 such that a gap S is formed between the inner periphery 20a of the housing 20 and the outer surface 50a of the bushing body 50 of the rack bushing 30.

As shown in FIG. 2, the rack bushing 30 includes first axial slits 31 and second axial slits 32. As shown in FIGS. 2 and 5, each of the first axial slits 31 extends from the first axial end 51 to a middle portion of the rack bushing 30 in the axial direction X. As shown in FIGS. 2 and 4, each of the second axial slits 32 extends from the second axial end 52 to a middle portion of the rack bushing 30 in the axial direction X. As shown in FIG. 2, the first axial slits 31 and the second axial slits 32 are arranged at regular intervals and alternately arranged in a staggered manner, in the circumferential direction Y. The formation of the first and the second axial slits 31 and 32 allows the rack bushing 30 to be elastically reduced in diameter.

The flange portion 60 is divided into a plurality of segments 60sg separated from each other by the first axial slits 31 in the circumferential direction Y. Each segment 60sg of the flange portion 60 is provided with a recessed groove 61 formed as a communication passage. As shown in FIGS. 2 and 4, the recessed grooves 61 (communication passages) each allow the first space P1, disposed on the housing end 20e side with respect to the rack bushing 30, and the gap S to communicate with each other. The recessed grooves 61 (communication passages) are formed in the outer surface of the flange portion 60, which faces the inner periphery 20a of the housing 20, and extend in the axial direction X.

As shown in FIG. 4, the inner periphery 20a of the housing 20 includes a portion 20a1 that is adjacent to the step portion 23 of the annular groove 21 and defines the gap S. A bottom portion 62 of the recessed groove 61 of the flange portion 60 is positioned inward R2 in the radial direction, compared with the portion 20a1 adjacent to the step portion 23 and defining the gap S. That is, a distance D1 between a central axis C1 of the housing 20 (corresponding to the central axis of the rack shaft 8 that serves as the steered shaft) and the bottom portion 62 of the recessed groove 61 is smaller than a distance D2 between the central axis C1 of the housing 20 and the portion 20a1 (D1<D2).

As shown in FIG. 3, a width W1 of the recessed groove 61 is larger than a width W2 of the second axial slit 32 (W1>W2) in the circumferential direction Y. When the rack bushing 30 is seen, in FIG. 2, from the axial direction X, at least a portion of each recessed groove 61 is positioned at the same position as at least a portion of a corresponding one of the second axial slits 32 in the circumferential direction Y of the rack bushing 30.

As shown in FIG. 4, the inner surface 50b of the bushing body 50 is provided with an axial communication groove 33, at the first axial end 51, or at a portion located inward R2 of the flange portion 60 in the radial direction. Each axial communication groove 33 allows a corresponding one of the second axial slits 32 to communicate with the first space P1 adjacent to the associated boot 70. As shown in FIGS. 2 and 5, the inner surface 50b of the bushing body 50 is provided with axial communication grooves 34 at the second axial end 52. The axial communication grooves 34 allow the respective first axial slits 31 to communicate with the second space P2.

As shown in FIG. 4, a first path K1 is formed to flow the air, in the housing 20, through the communication groove 33 on the inner periphery side of the rack bushing 30, between the first space P1 disposed on the housing end 20e side with respect to the rack bushing 30 and the second axial slit 32 communicating with the second space P2. As shown in FIG. 5, a second path K2 is formed to flow the air, in the housing 20, through the communication groove 34 on the inner periphery side of the rack bushing 30, between the first axial slit 31 communicating with the first space P1 and the second space P2. The first axial slit 31, the second axial slit 32, and the communication grooves 33 and 34 are provided with the grease. That is, the communication grooves 33 and 34 on the inner periphery side of the rack bushing 30 contain the grease. Accordingly, a cross-sectional area for the air flow in the communication grooves 33 and 34 is small. Thus, if the air flows only along the first path K1 and the second path K2 through the communication grooves 33 and 34, an abnormal noise, such as a whistling noise, may occur.

The present embodiment prevents the occurrence of such an abnormal noise. Specifically, as shown in FIG. 4, the first space P1 (housing-end side space) and the gap S, which is on the outer periphery side of the rack bushing 30 and is in communication with the second axial slit 32 extending from the second axial end 52 of the bushing body 50, are allowed to communicate with each other in the housing 20 via the communication passage (recessed groove 61) formed in the flange portion 60 and extending from the first axial end 51 of the bushing body 50 (the communication passage corresponds to a third path K3).

Accordingly, it is possible to increase the cross-sectional area for the air flow between the space (first space P1) on the first axial end 51 side and the space (second space P2) on the second axial end 52 side. This can prevent the occurrence of the abnormal noise caused by the air flow. Since the recessed groove 61 is formed in the flange portion 60 as a communication passage, the communication passage is easily made.

The bottom portion 62 of the recessed groove 61 is positioned inward R2 in the radial direction, compared with the portion 20a1 that is adjacent to the step portion 23 on the inner periphery 20a of the housing 20 and that defines the gap S. The recessed groove 61 thus can substantially serve as a communication passage. When the rack bushing 30 is seen from the axial direction X, at least a portion of each recessed groove 61 is positioned at the same position as least a portion of a corresponding one of the second axial slits 32 in the circumferential direction Y (see FIG. 2). This results in a shorter distance between the recessed groove 61 and the second axial slit 32, allowing the air to more easily flow.

Figure 6:
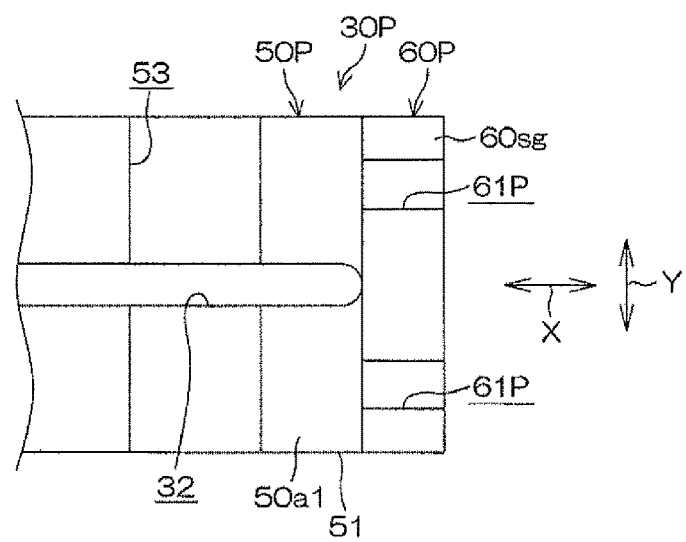
FIG. 6 is a schematic plan view of a main part of a rack bushing according to a second embodiment of the present invention.

As shown in FIGS. 2 and 4, the bottom portion 62 of each recessed groove 61 is positioned outward R1 in the radial direction, compared with a portion 50a1 that defines the gap S on the outer surface 50a of the bushing body 50. This can prevent the rack bushing 30 from deteriorating in strength. As shown in FIG. 3, the width W1 of the recessed groove 61 is larger than the width W2 of the second axial slit 32 (W1>W2) in the circumferential direction Y. This can increase a cross-sectional area of the recessed groove 61 for the air flow, more effectively preventing the occurrence of the abnormal noise. FIG. 6 is a schematic plan view of a portion around a flange portion 60P of a rack bushing 30P that is used in a steered shaft support structure of a second embodiment of the present invention. The rack bushing 30P of the second embodiment shown in FIG. 6 is different from the rack bushing 30 of the first embodiment shown in FIG. 3, in that the flange portion 60P is provided with a plurality of recessed grooves 61P serving as communication passages. To be specific, two recessed grooves 61P of a pair are disposed on both sides of the second axial slit 32 so as to be equidistant from the second axial slit 32 in the circumferential direction Y.

According to the present embodiment, the plurality of recessed grooves 61P with an increased cross-sectional area for the air flow can more effectively prevent the occurrence of the abnormal noise. Since the recessed grooves 61P and the second axial slit 32 are separated from each other in the circumferential direction Y, the rack bushing 30P can be prevented from deteriorating in strength. Three or more recessed grooves 61P may be provided. The width W1 of the recessed grooves 61P may be equal to or smaller than, or larger than the width W2 of the second axial slit 32 in the circumferential direction Y.

Elements of the second embodiment shown in FIG. 6 that are the same as those of the first embodiment shown in FIG. 3 are designated with the same reference numerals and characters as those of the first embodiment shown in FIG. 3. The present invention is not limited to the previously described embodiments. For example, the bottom portion 62 of the recessed groove 61 may be flush with the portion 50a1 of the rack bushing defining the gap S, or may be positioned inward R2 in the radial direction, compared with the portion 50a1, although these configurations are not shown in the figures.

At least one of the communication grooves 33 and 34 may not be formed. Communication grooves (not shown) may be formed in the inner surface 50b of the bushing body 50 at positions apart from the respective first axial slits 31 and the respective second axial slits 32 in the circumferential direction Y such that the other communication grooves extend, from the first axial end 51 to the second axial end 52 in the axial direction X. A through-hole passing through the flange portion 60 in the axial direction X may be used as a communication passage, instead of the recessed grooves 61, 61P.

In addition, a variety of modifications may be made to the present invention within the scope of the claims.

What is claimed is:

1. A steered shaft support structure comprising:
   a tubular housing through which a steered shaft is coaxially inserted and an inner periphery of which is provided with a step portion facing an end of the housing;
   a tubular bushing including a bushing body and a flange portion, the bushing body having a first axial end on a housing end side, a second axial end opposite to the first axial end, an outer surface facing the inner periphery of the housing, an inner surface that supports the steered shaft so that the steered shaft is capable of sliding in an axial direction, an outer recessed portion formed in the outer surface and extending in a circumferential direction, and an axial slit extending from the second axial end in the axial direction, across the outer recessed portion, the flange portion extending outward in a radial direction from the first axial end of the bushing body and being engaged with the step portion so as to be positioned in the axial direction; and an annular elastic member held in the outer recessed portion to elastically support the bushing on the housing such that a gap that communicates with the axial slit is formed between the inner periphery of the housing and the outer surface of the bushing body, wherein the flange portion is provided with a communication passage formed therein so that a housing-end side space disposed on the housing end side with respect to the bushing in the housing communicates with the gap, and the axial slit and the communication passage are circumferentially aligned.

2. The steered shaft support structure according to claim 1, wherein the communication passage is a recessed groove that faces the inner periphery of the housing.

3. The steered shaft support structure according to claim 2, wherein the inner periphery of the housing includes a portion that is adjacent to the step portion and defines the gap; and a bottom portion of the recessed groove is positioned inward in the radial direction, compared with the portion that is adjacent to the step portion and defines the gap.

4. The steered shaft support structure according to claim 3, wherein when the bushing is seen from the axial direction, at least a portion of the recessed groove is positioned at the same position as at least a portion of the axial slit in the circumferential direction.

5. The steered shaft support structure according to claim 4, wherein the bottom portion of the recessed groove is positioned outward in the radial direction, compared with a portion that is on the outer surface of the bushing body and defines the gap; and a width of the recessed groove is larger than a width of the axial slit in the circumferential direction.

6. The steered shaft support structure according to claim 2, wherein when the bushing is seen from the axial direction, at least a portion of the recessed groove is positioned at the same position as at least a portion of the axial slit in the circumferential direction.

7. The steered shaft support structure according to claim 6, wherein a bottom portion of the recessed groove is positioned outward in the radial direction, compared with a portion that is on the outer surface of the bushing body and defines the gap; and a width of the recessed groove is larger than a width of the axial slit in the circumferential direction.

8. The steered shaft support structure according to claim 1, wherein the axial slit terminates adjacent to the communication passage.

* * * * *